(12) United States Patent
Grewal et al.

(10) Patent No.: US 8,375,430 B2
(45) Date of Patent: Feb. 12, 2013

(54) ROAMING SECURE AUTHENTICATED NETWORK ACCESS METHOD AND APPARATUS

(75) Inventors: Karanvir Grewal, Hillsboro, OR (US); Kapil Sood, Beaverton, OR (US); Travis Schluessler, Hillsboro, OR (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1264 days.

(21) Appl. No.: 11/475,751

(22) Filed: Jun. 27, 2006

(65) Prior Publication Data

US 2008/0022354 A1    Jan. 24, 2008

(51) Int. Cl.
- G06F 7/04      (2006.01)
- G06F 15/16     (2006.01)
- G06F 17/30     (2006.01)
- H04L 29/06     (2006.01)

(52) U.S. Cl. ............................................. 726/9; 726/2

(58) Field of Classification Search ................. 726/1–10, 726/27, 30, 21, 26, 29; 705/30; 380/247–250, 380/255, 258, 270; 713/150–153, 168, 170, 713/172, 173, 182, 185
See application file for complete search history.

(56) References Cited

U.S. PATENT DOCUMENTS

| | | | |
|---|---|---|---|
| 6,370,380 B1 * | 4/2002 | Norefors et al. | 455/436 |
| 7,024,687 B2 * | 4/2006 | Chaudhuri et al. | 726/3 |
| 2004/0139012 A1 * | 7/2004 | Koskinen et al. | 705/40 |
| 2004/0193513 A1 * | 9/2004 | Pruss et al. | 705/30 |
| 2005/0268106 A1 * | 12/2005 | Mansell et al. | 713/182 |
| 2006/0005254 A1 * | 1/2006 | Ross | 726/27 |
| 2006/0021017 A1 * | 1/2006 | Hinton et al. | 726/10 |
| 2006/0090199 A1 * | 4/2006 | Okano | 726/6 |
| 2007/0006282 A1 * | 1/2007 | Durham et al. | 726/2 |
| 2007/0156911 A1 * | 7/2007 | Menten | 709/228 |

OTHER PUBLICATIONS

Adrian Friday, et al., Network Layer Access Control for Context-Aware IPv6 Applications, 2003, Kluwer Academic Publishers, Wireless Networks 9,299-309.*

* cited by examiner

Primary Examiner — Jeffrey Pwu
Assistant Examiner — Carlos Amorin
(74) Attorney, Agent, or Firm — Schwabe, Williamson & Wyatt, P.C.

(57) ABSTRACT

Secure re-authentication of host devices roaming between different connection and/or access points within a network controlled by the same administrative domain is described. Platform overhead associated with exchanging information for authentication and/or validation on each new connection during mobility is reduced by enabling prior authenticated network access to influence subsequent network access.

17 Claims, 7 Drawing Sheets

ROAMING SECURE AUTHENTICATED NETWORK ACCESS METHOD AND APPARATUS

TECHNICAL FIELD

Presented embodiments relate to the fields of data processing and data communication. More particularly, various embodiments relate to techniques for reducing the platform overhead associated with exchanging information on each connection during mobility by enabling prior authenticated network access to control subsequent network access.

BACKGROUND

Mobile host devices attempting to shift between physical networking mediums and/or network access points within a network typically have to satisfy various security measures before the requesting device may be authorized and authenticated. Industry-wide development of stronger network security measures to ensure that unauthorized and incompliant devices are not allowed access to various network assets are currently motivated by, among other things, the proliferation of malware mechanisms (e.g., worms, viruses, Trojan horses, rootkits) which often propagate into corporate networks. In an endeavor to eliminate, isolate, and reduce the impact and/or effects of malware, various proprietary and/or standards-based solutions attempt to measure and to report various operational attributes of a mobile host device, which are evaluated by the network before allowing that mobile host device to connect to a protected network. Unfortunately, these client side solutions often require the assistance of the very operating system on the mobile host device that is attempting to be validated.

Mobile devices present additional difficult challenges to enterprise network security as these devices, by design, move, switch, and/or roam between multiple network access points. Unfortunately, many of the assumptions that may be attributed to fixed network devices to reduce the authentication and authorization process are unavailable to similarly configured mobile devices resulting in a protracted authentication and authorization process for each new network access point, especially when the mobile device switches between networking mediums, such as wired to wireless and vice versa. Moreover, current definitions of authentication frameworks require substantive exchange of platform state information on each connection attempt, placing an even greater authentication burden on a mobile client. In addition to the previously described authentication frameworks, there are wireless (e.g., the IEEE 802.11i standard, IEEE std. 802.11i-2004, published Jul. 23, 2004) and emerging wired (e.g., the IEEE 802.1af draft standard, IEEE P802.1af/D0.4, published Jan. 16, 2006 and/or the IEEE 802.1AE draft standard, IEEE P802.1AE/D5.1, published Jan. 19, 2006) security protocols, which often need to be executed after each authentication attempt, adding additional overhead on these devices.

Complete network re-evaluation of the requesting mobile platform during mobility connections bears a high cost in terms of latency, overhead, and power consumption. Each time a switch between network connections is desired, the mobile host device responds to various high overhead and protracted authentication and authorization checks solicited by the enterprise network before normal network operation can continue/begin. As such, current network access solutions make reliable multimedia delivery to mobile devices transitioning between multiple access points impractical and require far too much overhead for applications that consistently exchange high volumes of data with mobile devices, such as handheld digital devices and/or laptops.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Figure 1:
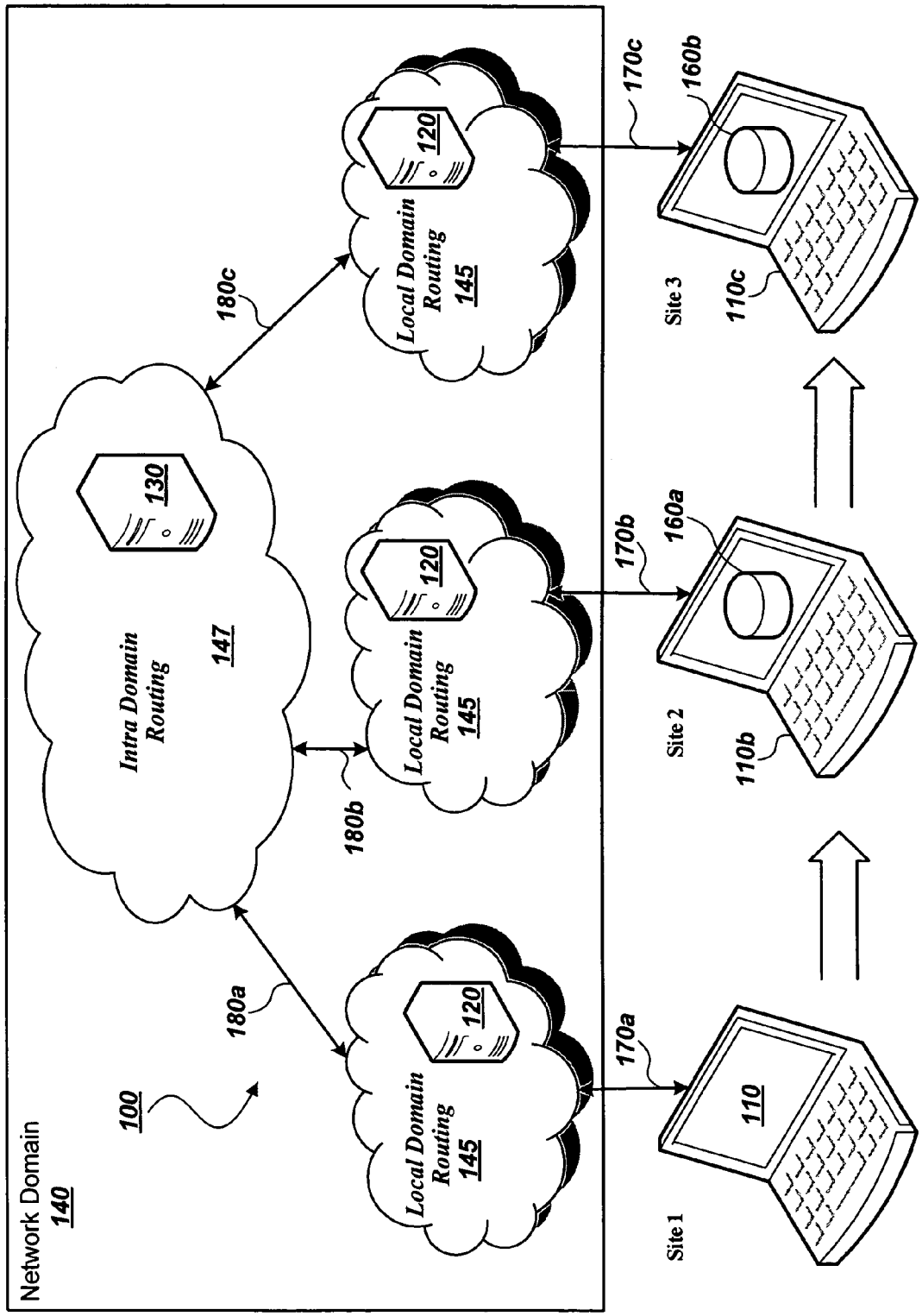
FIG. 1 illustrates a block diagram of roaming secure authenticated network access by a host platform sequentially coupled with different network components, in accordance with at least one embodiment.

Various embodiments, described below, have been developed in response to the current state of the art and, in particular, in response to the previously identified problems and needs of secure mobile authentication and authorization that have not been fully or completely solved by currently available authentication systems and protocols for mobile devices. Embodiments provide a method to reduce time, power, and computational cycles required for an endpoint mobile device to transition between access points or physical mediums on a network. In at least one embodiment, a 'token protocol' based approach is presented, where status from a previous connection may be securely cached for a period of time without fundamentally impacting the underlying security frameworks being used by the network. Cached information may be presented at each connection attempt to bypass the performance of a full and thorough re-evaluation of the mobile device so long as the mobile device continues to satisfy network security criteria.

In the following detailed description, reference is made to the accompanying drawings which form a part hereof wherein like numerals designate like parts throughout, and in which are shown, by way of illustration, specific embodiments. It is to be understood that other embodiments may also be utilized and structural or logical changes may be made without departing from the scope of the embodiment. In other instances, well-known circuits, structures and techniques have not been shown in detail in order not to obscure the understanding of this description. Therefore, the following detailed description is not to be taken in a limiting sense, and the scope of the various embodiments is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Reference in the specification to a "mobile device" means that a particular feature, structure, or characteristic, namely device mobility or the ability for the device to roam to alternative access points, is included in at least one embodiment of the digital device as used herein. Typically, digital devices may include general and/or special purpose computing devices, such as a laptop computer, a personal digital assistant (PDA), and/or console suitably configured for practicing the present invention in accordance with at least one embodiment. Reference in the specification to "remote device" means a network device electronically coupled to the mobile device or host platform via a network interface and suitably configured for practicing the present invention in accordance with at least one embodiment. Exemplary network devices may include general and/or special purpose computing devices, such as a gateway, a router, a bridge, a switch, a hub, a repeater, and/or a server.

Referring to FIG. 1, a block diagram illustrating roaming secure authenticated network access by a mobile device 110 or host platform at different sites or network access points in accordance with at least one embodiment is shown. Embodiments describe a protocol for conveying network access requests from a mobile device 110 including, where appropriate, prior network access information 160 and receiving subsequent network access determinations and/or related policy information, based in part on the prior network access information 160, if any, which can then be enforced on the mobile device 110. These network access requests and subsequent responses may be conveyed to the network resources 140 via a variety of connection types 170 from a variety of site locations (e.g., site 1, site 2, and site 3). Platform management components on the mobile device 110 provide a trust anchor for secure communication of reliable, independently attested attribute information to remote devices, such as a Network Access Device (NAD) 120, within a given local domain 145 of the network domain 140. One embodiment uses an instantiation of the Extensible Authentication Protocol-Flexible Authentication via Secure Tunneling (EAP-FAST) protocol, a publicly accessible IEEE 802.1X EAP type protocol, to facilitate this exchange and is shown in more detail in FIGS. 2 and 3 below. An Internet Engineering Task Force (IETF) informational draft of an exemplary EAP-FAST protocol by Cisco Systems® was first submitted for publication on Feb. 8, 2004 and was posted on Feb. 10, 2004). The illustrated embodiment of the EAP-FAST protocol is intended for use with IEEE 802.1X EAP type protocol as defined in the IEEE 802.1X standard, IEEE std. 802.11X-2001, published Jul. 13, 2001.

Once the attributes of the mobile device 110 are reported, in various embodiments, a Policy Decision Point (PDP) and/or network access server 130 logically connected in either the local domain 145 or the intra domain 147 of the network domain 140 may make a policy decision regarding whether to allow the requested connection. In various embodiments, the network access server 130 may receive the initial network access request from one NAD 120 assigned to site 1 via network connection 180a and subsequent network access requests from the NAD 120 assigned to site 2 via network connection 180b and/or site 3 via network connection 180c. The mobile device 110 may use a different connection type 170a-170c for each network access request. Alternatively, the subsequent network access requests could also originate from the same connection type 170a and/or site location as the previous request.

In various embodiments, these policy decisions are returned to a trusted Policy Enforcement Point (PEP) in the form of policy information. In one embodiment, the PEP may include the processor and management components within the trust anchor on the host platform of the mobile device 110, which are shown in more detail in FIG. 4.

In one embodiment, if an access request is to be granted, a token is provided in network access information 160 that is transmitted back to the mobile device 110. In accordance with various embodiments, this token may be used in subsequent network access requests if the trust anchor can verify that the mobile device has not experienced any intervening events that would impede continued network access.

In this way the token from the previous network access can eliminate or reduce the overhead and the protracted authentication and authorization checks normally required of mobile devices when shifting between physical networking mediums and/or network access points. Each time the mobile device 110 switches between mediums, such as wired to wireless and vice versa, the token from the prior network access can be provided to NAD 120 and/or PDP 130 to invoke an accelerated network access authentication exchange.

In one embodiment, the authentication token is tamper-resistant. The tamper-resistant authentication token includes a token identifier, a token version identifier, a token validity timestamp, a token context identifier, and/or an integrity check value (ICV), in various embodiments. In one embodiment, a portion of the tamper-resistant authentication token includes variable length opaque-encrypted data only visible to the PDP 130, where the data contains a consolidated posture token from the last authentication and associated policy information issued to the mobile device 110 based on the last authentication. In one embodiment, the PDP 130 may include other information needed to make future access and policy decisions.

In one embodiment, the contents of the token include variable posture information. The contents of the token are dependent on the data to be included for successful future accelerated network access exchanges. In one embodiment, the PDP is free to add, remove, and/or modify token content depending on the implementation and/or requirements of the governing PDP. In one embodiment, for interoperability purposes and to provide the mobile device 110 with some indication of the relative posture 'state' associated with the token, some posture data within the token is exposed to the mobile device 110.

In one embodiment, an index into a PDP database for a master key (PMK) or derivative is issued as part of an access grant. In one embodiment, the master key of a PMK is embedded within the token. Further embodiments include details relating to all previous connection contexts, such as wired and/or wireless connections.

In various embodiments, the policy information transmitted in network access information 160 to mobile device 110 at the most recent connection point indicates whether network access for the host device is granted. If granted, the policy information may also include information concerning which network resources should be accessible to the mobile device 110 within that network domain 140.

Although various embodiments describe the different security properties of this information exchange, the security features may be used individually or in various combinations so that exchanged information cannot be modified by an intermediate entity as it is exchanged between the mobile device 110 and the remote device, or at least the likelihood of such information being modified is substantially reduced.

Figure 2:
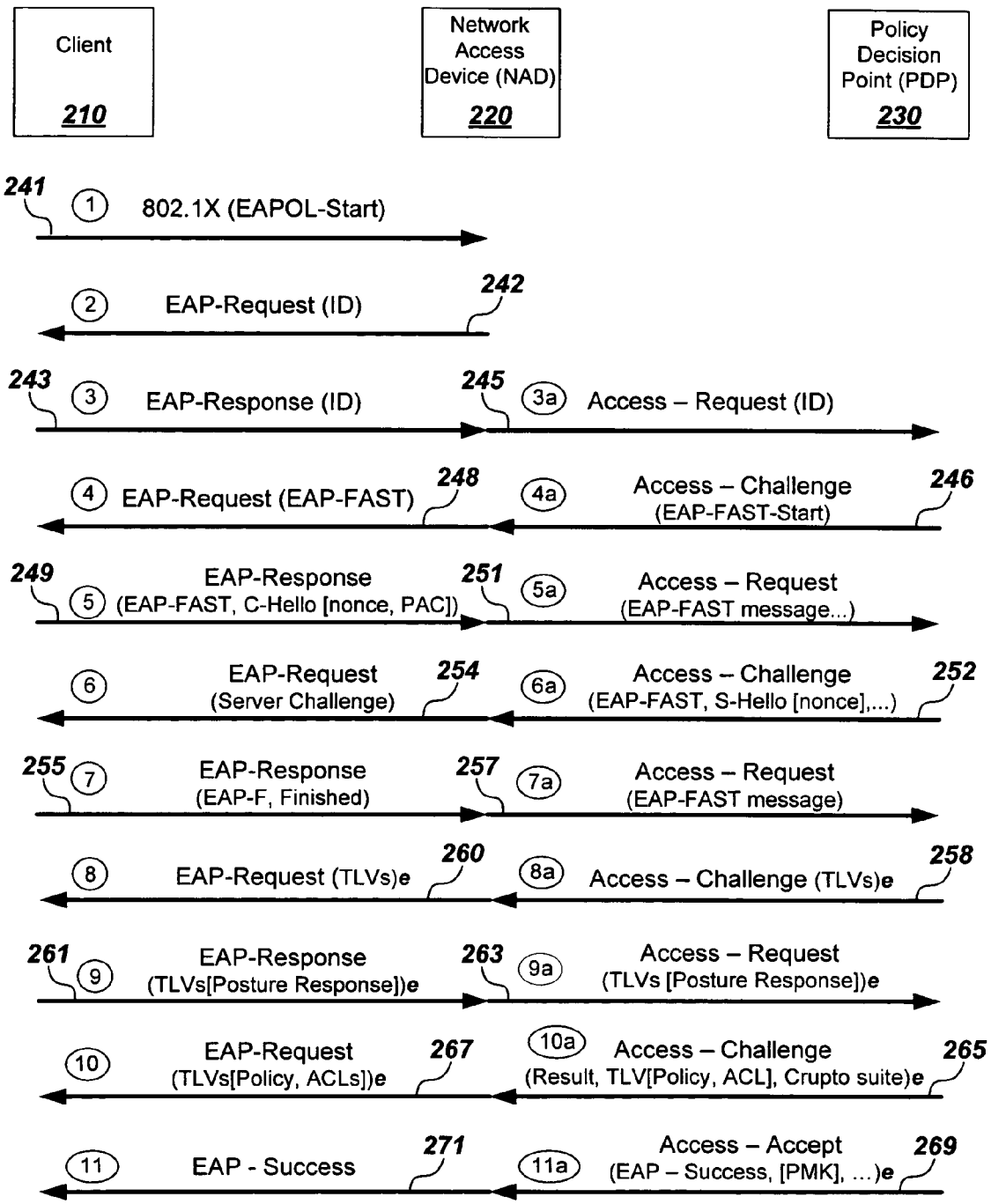
FIG. 2 illustrates a network access authentication exchange between a host platform and various network components, in accordance with at least one embodiment.
Figure 3:
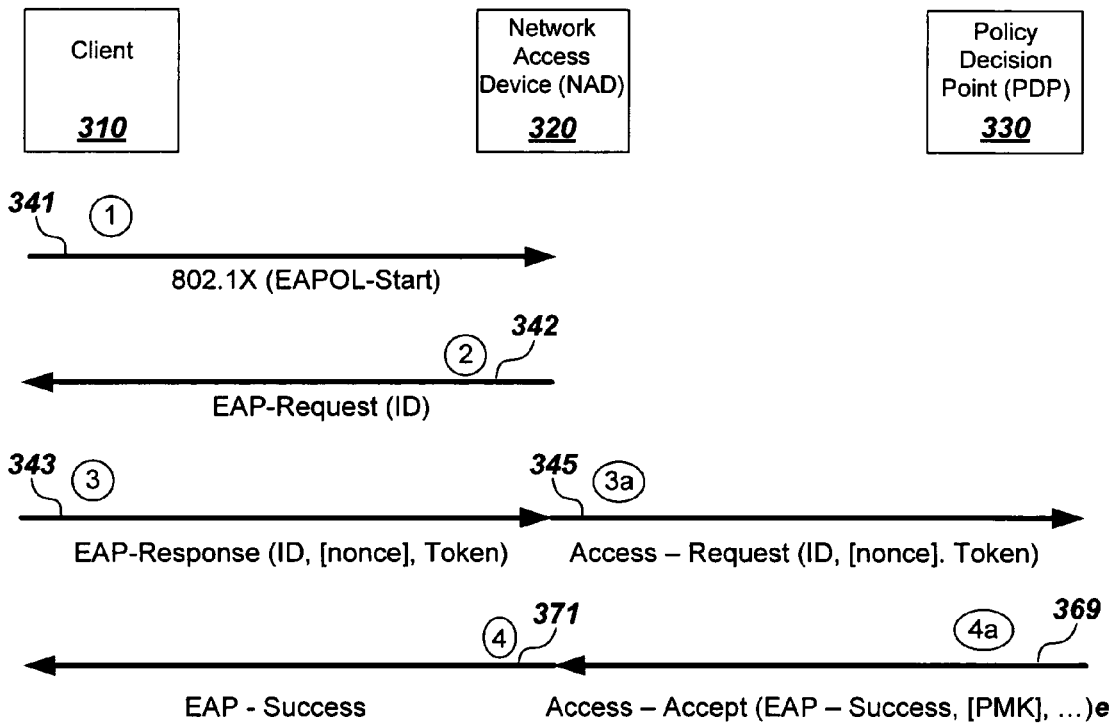
FIG. 3 illustrates an accelerated network access authentication exchange between a host platform and various network components, in accordance with at least one embodiment.

In the exchanges illustrated in FIGS. 2 and 3, a combination of IEEE 802.1X/EAP-FAST connection frameworks is used; however, other network access authentication protocols may be used. Although the details are described in the context of an IEEE 802.1X/EAP-FAST exchange and the subsequent generation of master/session keys within a typical initial connection attempt (FIG. 2) and subsequent connection attempts (FIG. 3), the exchange model is equally applicable across a wide range of connection frameworks.

Referring to FIG. 2, a network access authentication exchange between a host platform and various network components, as represented in the connection type 170a in FIG. 1, is shown in accordance with at least one embodiment. The network access authentication exchange to seek access to a network is generally conducted between a client 210, a network access device (NAD) 220, and a Policy Decision Point (PDP) 230. In one embodiment, the client 210 is a host platform known as an access requester. In one embodiment, the client 210 and PDP 230 are both separately in communication with the NAD 220. In one alternate embodiment, the NAD 220 and the PDP 230 are part of the same network device.

In one embodiment, the client 210 initiates the network access authentication exchange at transmission one 241 by sending an 802.1X transmission including an EAPOL-Start request to the NAD 220. In the second transmission 242, the NAD 220 responds to the EAPOL-Start request by sending an EAP-Request including identification.

In one embodiment, the client 210 responds with the third transmission 243 of the network access authentication exchange by sending an EAP-Response including identification to the NAD 220, of which the NAD 220 forwards at least a portion in an access request with the received clients identification sent as part of a related third transmission 245 to the PDP 230. Upon receiving the access request, the PDP 230 initiates fourth transmission 246 of the network access authentication exchange to the NAD 220 that contains an access challenge which includes EAP-FAST Start information. The NAD 220 initiates a related fourth transmission 248 to the client 210 by sending an EAP-Request including EAP-FAST information.

The client 210 responds with the fifth transmission 249 of the network access authentication exchange by sending an EAP-Response to the NAD 220 including EAP-FAST information and client Hello (C-Hello) information, such as nonce and PANA client (PAC) information. The NAD 220 forwards at least a portion in an access request with the received clients EAP-FAST information and C-Hello information combined and configured into an EAP-FAST message and sent as part of a related fifth transmission 251 to the PDP 230.

The PDP 230 responds to the received access request by initiating the sixth transmission 252 of the network access authentication exchange and sending an access challenge including EAP-FAST information and the new S-Hello information. The S-Hello includes nonce information which changes with time so the current time can be compared with the nonce information. Nonce-enabled communication allows both the PDP 230 and the client 210 to determine whether or not a legitimate request to replay or to reproduce a file has been made. The NAD 220 forwards the server challenge in an EAP-Request as part of related sixth transmission 254 of the network access authentication exchange to the client 210. The seventh transmission 255 of the network access authentication exchange is an EAP-Response from client 210 to NAD 220 including EAP-F and Finished information that is then conveyed by the NAD 220 to the PDP 230 in a related seventh transmission 257 that includes an access request with EAP-FAST message information.

The first encrypted transmission of the network access authentication exchange is the access challenge sent between the PDP 230 and the client 210 as part of the eighth transmission 258, in response to the earlier transmissions and includes the first encrypted Threshold Limit Value (TLV) information. In FIGS. 2 and 3, the "e" identifies authenticated and encrypted payloads, which are often considered secure from in-transit attackers. The related eighth transmission 260 between the NAD 220 and the client 210 is an encrypted EAP-Request including the TLV information.

The ninth transmission 261 between the client 210 and the NAD 220 is an encrypted EAP-Response that includes posture response information of the client 210 to the TLV information. The posture response information is conveyed to the PDP 230 in access request as part of an encrypted related ninth transmission 263. The result, Crypto suite, and TLV policy and ACL information are transmitted from the PDP 230 to the NAD 220 in an encrypted access challenge sent with the tenth transmission 265 of the network access authentication exchange. The NAD 220 forwards the TLV policy and access control list (ACL) information in an encrypted EAP Request sent in the related tenth transmission 267 to the client 210. Once the PDP 230 makes the network access determination and an access decision is made, network access policies for the requesting platform are either conveyed to the NAD 310 or Policy Enforcement Point (PEP) in the encrypted eleventh transmission 269 of the network access authentication exchange. The NAD 310 or PEP receiving the transmission controls, based in part on whether the access authorization has been approved or denied, and under what restrictions the client device is allowed to get onto the network. In one embodiment, an encrypted access accept response would include EAP-Success information and a pair wise master key (PMK) which may then be conveyed by the NAD 220 to the client 210 in an EAP-Success response sent in a related eleventh transmission 271. Once a decision is made, network access policies for this platform are conveyed to a NAD or Policy Enforcement Point (PEP). The NAD or PEP controls if, and under what restrictions, the client device is allowed network access.

Referring to FIG. 3, an accelerated network access authentication exchange between a host platform and various network components, as represented in the connection types 170b and 170c in FIG. 1, is shown in accordance with at least one embodiment. The accelerated network access authentication exchange is generally conducted between a client 310 having information associated with a prior network access grant, a network access device (NAD) 320, and a Policy Decision Point (PDP) 330. In one embodiment, the stored information (160a and 160b) includes a tamper-resistant authentication token associated with at least one prior network access grant (170a and 170b respectively).

While IEEE 802.1X/EAP-FAST protocol transmissions were used in the illustrated exchange of FIG. 2 and FIG. 3, as was previously indicated, other network access authentication protocols may also be used and accelerated. The illustrated accelerated EAP-FAST protocol exchange process effectively reduces the network access authentication exchange from the several identified transmissions and the related transmissions (241-271) illustrated in FIG. 2 to only a few transmissions and the related transmissions (341-371) illustrated in FIG. 3.

In one embodiment, the client 310 initiates the network access authentication exchange at transmission one 341 by sending an 802.1X transmission including an EAPOL-Start request to the NAD 320. In the second transmission 342, the NAD 320 responds to the EAPOL-Start request by sending an EAP-Request including identification.

The client 310 responds in the third transmission 343 of the accelerated network access authentication exchange by sending an EAP-Response to the NAD 320 that includes various identification information, along with nonce and token information. In this manner the third transmission 343 includes more connectivity information than the initial network access authentication exchange, which may accelerate the authentication process. The NAD 320 forwards at least a portion of the enhanced EAP-Response in an access request with the received client's identification, nonce, and token information as part of a related third transmission 345 to the PDP 330. If the PDP 330 determines that the received token is still valid, the accelerated network access authentication exchange authorizes an access accept response to be sent using an encrypted fourth transmission 369 that includes EAP-Success information and PMK information. In related fourth transmission 371, the NAD 320 sends EAP-Success information to the client 310.

In one embodiment, new and/or updated policy information is conveyed, along with the encrypted fourth transmission 369 from the PDP 330 to the NAD 320 and/or the related fourth transmission 371 from the NAD 320, to the client 310 to govern authorized network access. In one embodiment, the updated policy information could modify and/or supplement portions of policy information previously received by the client 310. An alternative embodiment enables the client 310 to continue network access under the policy information received during a previous connection without necessitating additional updates from the PDP 330. Any common policy information resident on the client 310 represents potential available data that further reduces time, power, and computational cycles required for an endpoint mobile device to transition between access points or physical mediums on a network.

Figure 4:
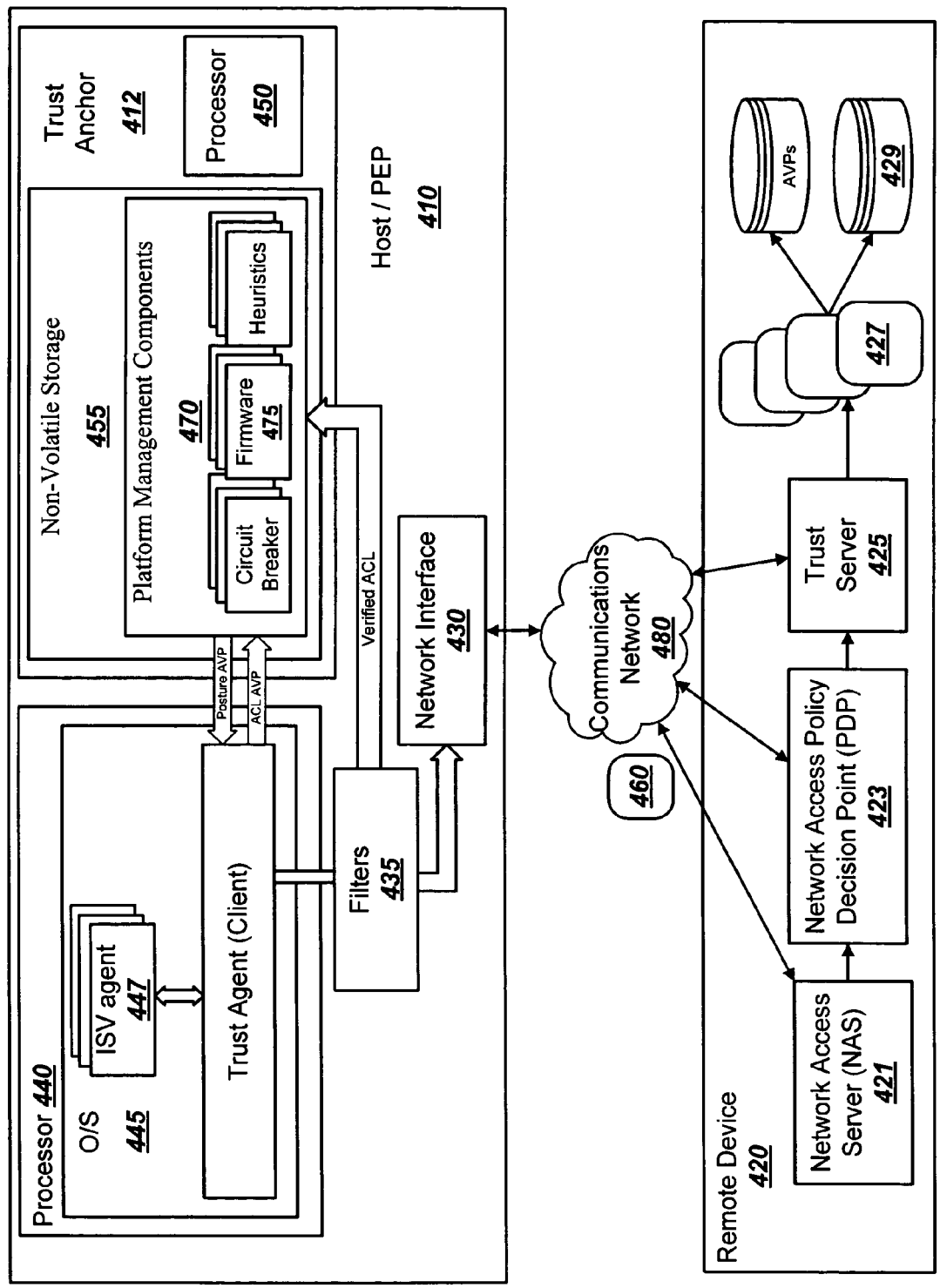
FIG. 4 illustrates a block diagram of a host platform coupled with various network components, in accordance with at least one embodiment.

Referring to FIG. 4, a high-level block diagram of a platform posture and policy information exchange between at least one host platform 410 and at least one remote device 420, in accordance with various embodiments, is shown. Embodiments describe a protocol for conveying network access requests from the at least one host platform 410 including, where appropriate, platform posture information 460 having prior network access information, to the at least one remote device 420. The at least one host platform 410 subsequently receives network access determinations and/or related policy information, if any, based in part on the transmitted platform posture information 460, which can then be enforced on the at least one host platform 410.

The illustrated host platform 410 includes a network interface 430, a first processor 440, a second processor 450, an operating system 445, one or more software components 447, and one or more platform management components 470 operationally coupled to each other as shown. The one or more software components 447, such as independent software vendor (ISV) agents, are adapted to be executed by the first processor 440 under the direction of the operating system 445. The platform management components 470 are adapted to be executed by the second processor 450 independent of the operating system 445. The network interface 430, coupled with the first processor 440 and/or the second processor 450, is configured to communicate with the at least one remote device 420 across communication network 480. The communication network 480 may include at least one gateway, router, bridge, switch, hub, repeater, and/or server. Additional components may be included in various embodiments of the host platform 410 which are not illustrated in FIG. 4.

In various embodiments, the platform management components 470, determine platform posture information 460 of the host 410 via firmware agents 475. In one embodiment, firmware agents 475 exhibit at least two characteristics: 1) no code executing within the host operating system 445 can modify or tamper with firmware agent code, prevent firmware agent code from running, or circumvent operation of the firmware agent 475; and 2) firmware agents 475 have exclusive access to host resource, for example, filters 435 associated with the network interface 430, and unrestricted access to other resources, such as non-volatile storage 455 and associated controllers. In this manner, embodiments may provide a tamper resistant execution environment on host platform 410, which may allow the trust anchor 412 of host platform 410 to act as a PEP acting on behalf of the network administrator to restrict or enable network access of the host platform 410 based on detected operational conditions. In one embodiment, at least some platform operational conditions may be reported to the remote device 420 in the form of platform posture information 460.

The platform posture information 460 is exchanged with the remote device 420, via the network interface 430, across communications network 480. In one embodiment, the platform posture information 460 includes host posture information and/or firmware posture information. In one embodiment, the platform posture information 460 includes a tamper-resistant authentication token. The token, depending on current connection status, may be associated with a current network access grant and/or at least one prior network access grant.

In one embodiment, the tamper-resistant authentication token includes at least one of a token identifier, a token version identifier, a token validity timestamp, a token context identifier, and an integrity check value (ICV). Thus, in one embodiment, the token may either identify whether the host platform 410 continues to satisfy network security criteria or whether an intervening event may require the host platform 410 to be re-authenticated. For example, in one embodiment, the filters 435 may be designated for expiration after a period of time so that they can be securely refreshed by a PDP on a subsequent connection attempt during re-authentication.

In one embodiment, the host platform 410 may transmit encrypted posture AVP requests/responses or TLVs to the remote device 420 over an authenticated channel. In similar fashion, the remote device 420 may transmit encrypted AVP requests/responses or TLVs to the host platform 410.

In one embodiment, the trust anchor 412 may modify the token and thereby authenticate the host platform based on previously received policy information including a verified access control list (ACL). The ACL includes one or more constraints related to time of access, network traffic filters, firmware version, and/or firmware operational status.

In various embodiments, the platform posture information 460 is transmitted using multiple data fragments to the remote device 420. Each data fragment includes posture information associated with a platform component of the host platform. The platform posture information 460 contains information about the posture of various platform components including, but not limited to, the management engine (ME), host Operating System (O/S) 445, software services, hardware components, and any other entity deemed pertinent for evaluation based on administrative policy 427 and capabilities available within a given platform architecture.

The illustrated at least one remote device 420 may include a network access server (NAS) 421, network access policy decision point (PDP) 423, and a trust server 425. The trust server 425 may compare received posture attribute-value pairs (AVPs) with administrative policies 427, which may include stored type-length values (TLVs) and/or AVPs 429, to determine whether to allow host platform 410 to connect to additional network resources. In one embodiment, the trust server 425 may return AVPs containing instructions for remediation or access control lists (ACLs) to set filters 435. Accordingly, additional remote network devices and/or components may be included in various embodiments of the network which are not illustrated in FIG. 4.

Figure 5:
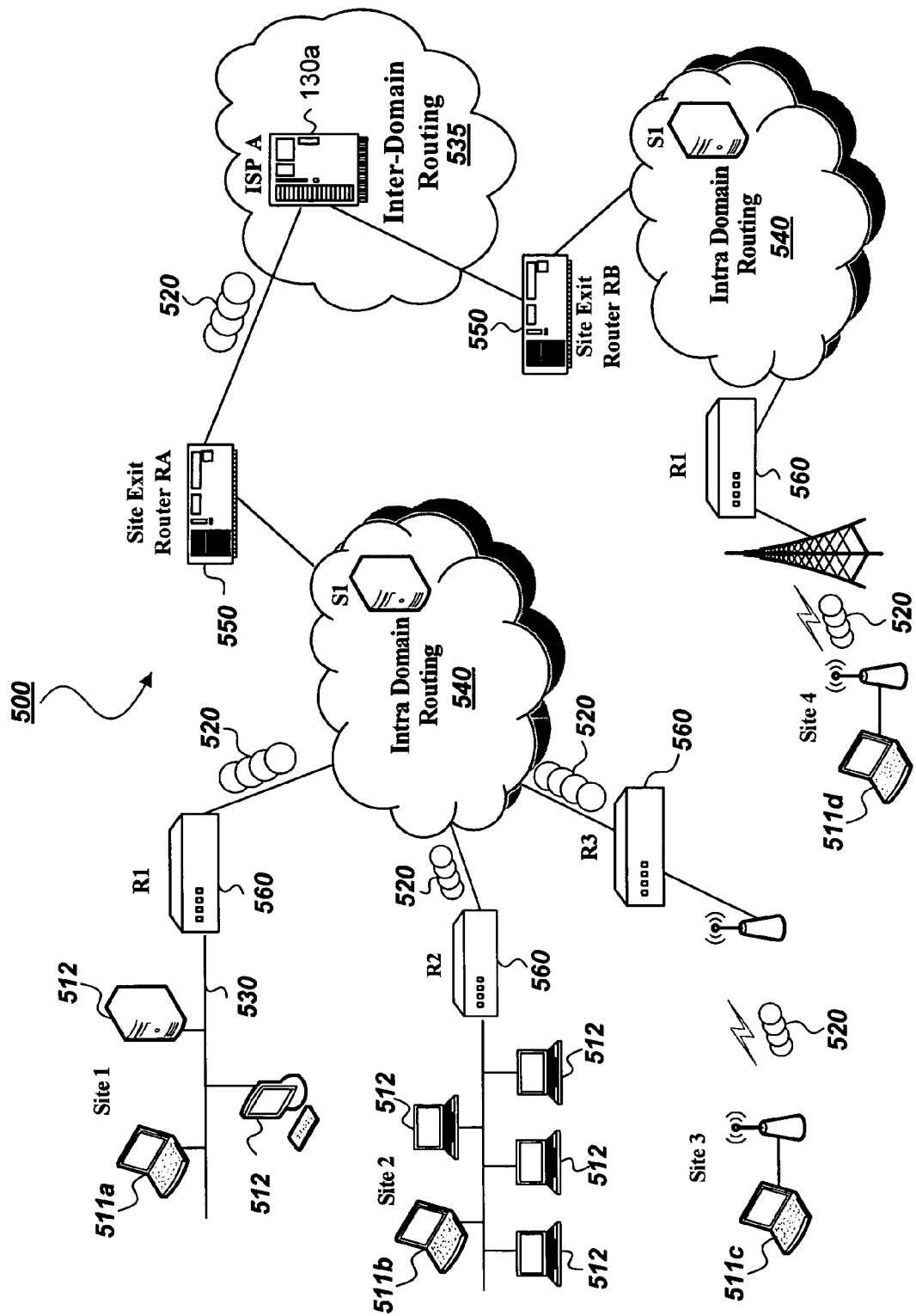
FIG. 5 illustrates a suitable operating environment for roaming secure authenticated network access by a host platform as presented in FIGS. 1 and 4, in accordance with various embodiments.

Referring now to FIG. 5, a suitable operating environment 500 for roaming secure authenticated network access by a mobile host platform or mobile device 511 is shown. A typical example of this is within an employee campus with a plurality of different digital devices 512, including at least one mobile device 511 that regularly moves between available network access points or hotspots controlled by the same administrative domain 540. A natural extension of this is mobility between wired access points (e.g. network switches) where a mobile device 511a disconnects from the office network at Site 1 and the mobile device 511b re-connects in a conference room at Site 2 for a meeting and, after the meeting, connects back to the office network port at Site 1.

Normally the mobile device 511 shifting between physical networking mediums (e.g., mobile device 511a at Site 1 or 511b at Site 2 moving to mobile device 511c at Site 3 or 511d at Site 4) and/or network access points (e.g., mobile device 511a-d moving to a different Site) face high overhead and protracted authentication and authorization checks each time they switch between mediums, such as wired to wireless and vice versa. However, embodiments such as those presented in FIGS. 1 and 4 may accordingly use a 'token protocol' based approach, where status from a previous connection may be securely cached for a period of time without fundamentally impacting the underlying security frameworks being used by the network. Cached information may be presented at each connection attempt to bypass performing a full and thorough re-evaluation of the mobile device, so long as the mobile device 511 continues to satisfy established network security criteria. Namely, the trust anchor of the mobile device 511 certifies that no intervening activities by the mobile device 511 that would result in a denial of a network access request have occurred. For example, when the mobile device 511 is merely moving between network access points controlled by the same administrative domain 540 and the mobile device 511 has not made connections to any untrusted networks. This protocol aids in improving the user experience by eliminating the need for providing credentials via endless pop-up dialogs and by reducing connection times at each connection attempt.

With the upcoming technologies mentioned above, at each discrete connection to the network there is a need to re-evaluate the device state as well as obtain user/device credentials. This is a high cost, time-consuming operation. This invention is a method to reduce the time, power, and computational cycles required for an endpoint device to transition between access points or physical mediums on a network. In one embodiment, the methods presented can be extended beyond wired and wireless mobility, to mobility between different types of wireless networks (e.g., cellular, WiMax, and Next Generation Evolution—NGE (4 G)).

Figure 6:
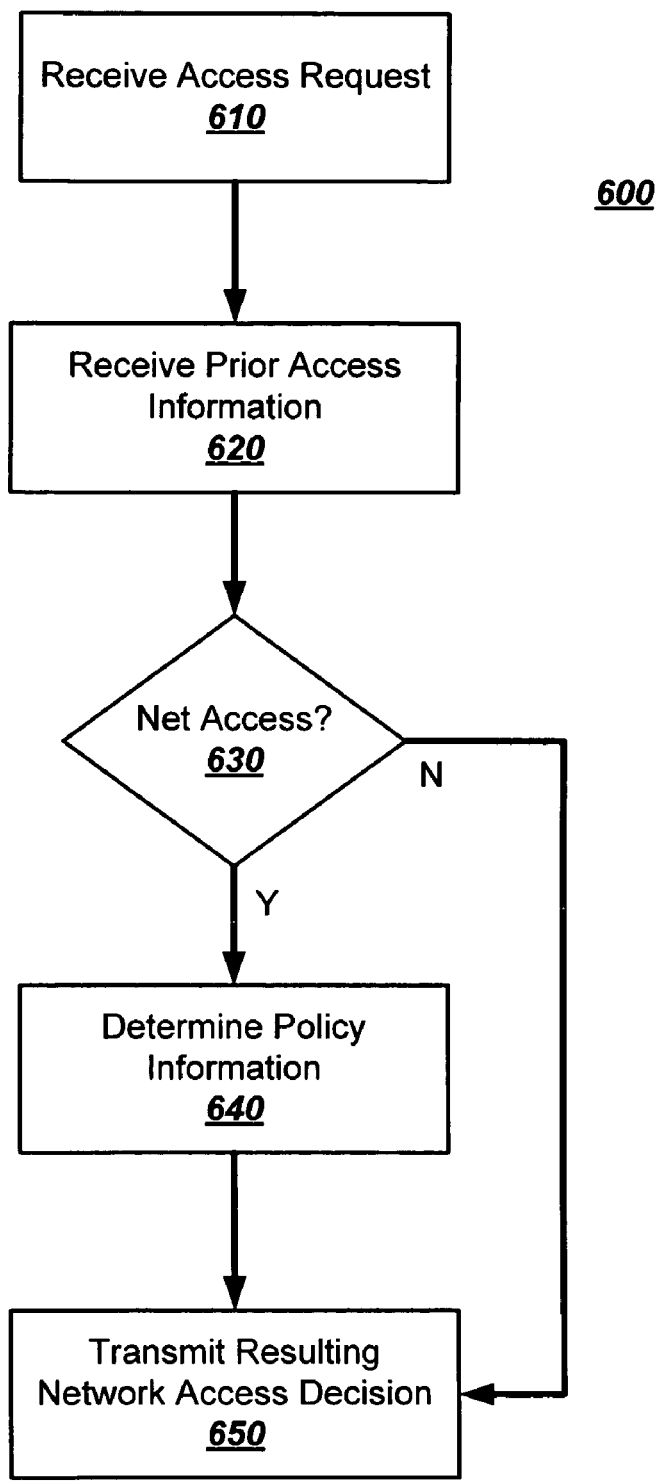
FIG. 6 illustrates a flow diagram view of a portion of the operations of a remote device as presented in FIG. 1 in further detail, in accordance with various embodiments.
Figure 7:
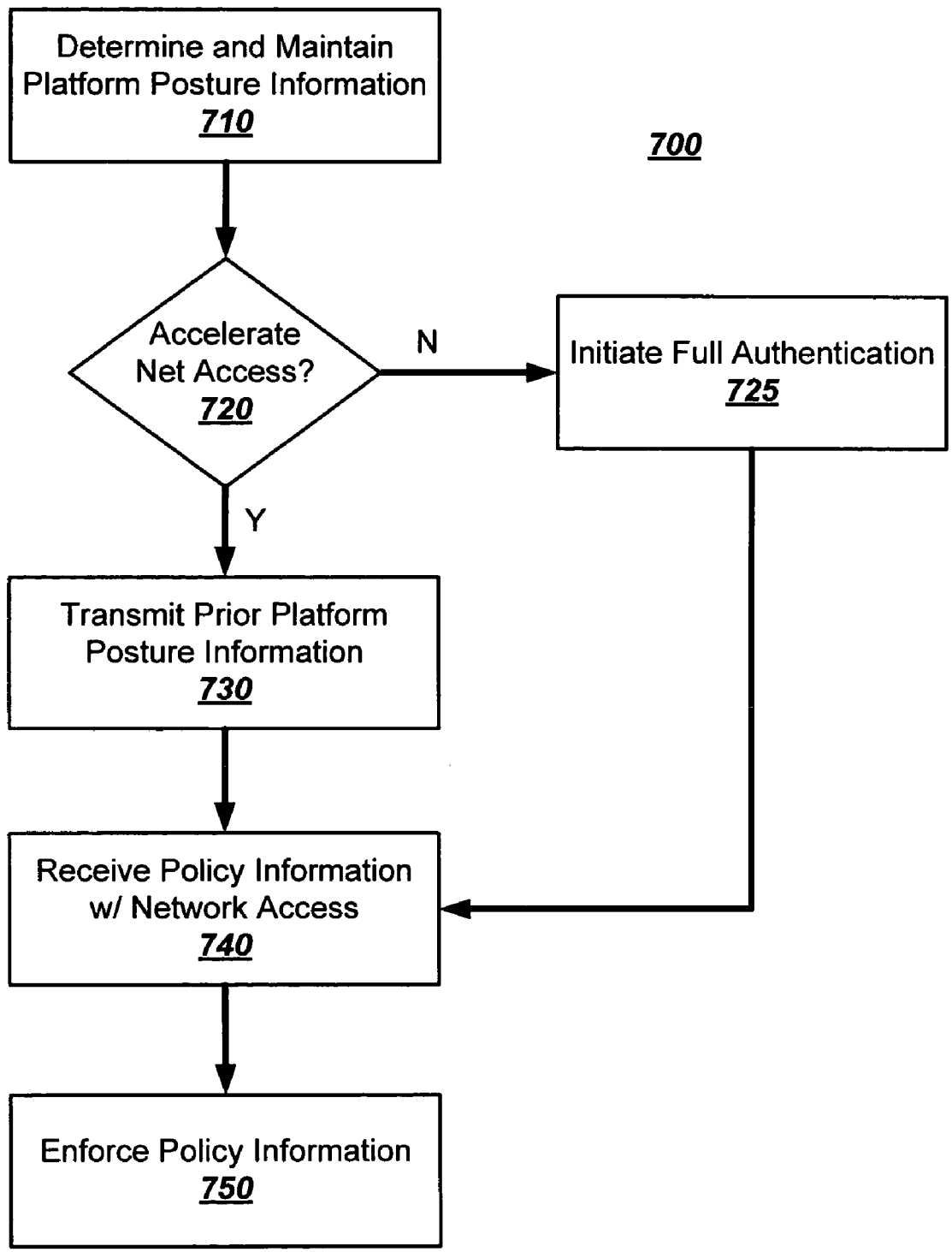
FIG. 7 illustrates a flow diagram view of a portion of the operations of a host platform as presented in FIGS. 1 and 4 in further detail, in accordance with various embodiments.

Turning now to FIGS. 6 and 7, methods in accordance with various embodiments are described in terms of computer firmware, software, and hardware with reference to a series of flow diagrams. In various embodiments, portions of the operations to be performed by a host platform device and/or remote devices may constitute state machines or computer programs made up of computer-executable instructions. These instructions are typically maintained in a storage medium accessible by the host platform device and/or remote devices.

A storage medium includes any mechanism that provides (i.e., stores and/or transmits) information in a form readable by a machine (e.g., a computer). For example, a storage medium includes read only memory (ROM), random access memory (RAM), magnetic disk storage media, optical storage media, flash memory devices, electrical, optical, acoustical or other form of propagated signals (e.g., carrier waves, infrared signals, digital signals), and the like.

Describing the methods by reference to a flow diagram enables one skilled in the art to develop such programs, including instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

In addition, the present invention is not described with reference to any particular programming language. It will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or a produce a result.

Referring to FIG. 6, a flow diagram view of a portion of the operations of a remote device 600 as presented in FIG. 1 is shown in further detail, in accordance with various embodiments. In block 610, the remote device 600 receives an access request. In one embodiment, the access request initiates a network connection (e.g., as show in FIGS. 2 and 3 via 802.1x/EAP) to a Network Access Device (NAD) which may be redirected to a policy decision point (PDP), thereby communicating the intent of the requesting device to connect to the network. In one embodiment, the access request is ultimately routed to a policy server which is equipped to make authorization decisions on network access, based on an administrative policy, via a control channel connection.

In response, to control channel communications based, in part, on the received access request, the remote device 600 may subsequently receive prior access information in block 620. In one embodiment, the prior access information includes a tamper-resistant authentication token associated with prior network access grant(s). The tamper-resistant authentication token may include a token identifier, a token version identifier, a token validity timestamp, a token context identifier, and/or an integrity check value (ICV). In one embodiment, the tamper-resistant authentication token indicates host posture information and/or firmware posture information of the host device.

In one embodiment, the prior access information provided as part of this control protocol may include host platform information such as identity, security credentials, user information, and state of the platform. In one embodiment, the platform information is conveyed by the access requestor to a policy server associated with the remote device 600.

Upon receiving the prior access information in block 620, the remote device determines whether network access, if any, should be granted in query block 630. In one embodiment, the policy server associated with the remote device 600 checks the platform information with a policy database for validity and accuracy. Thereby enabling the policy server to make an informed decision on whether to allow the client to access the given network based in part on prior network access of the access requestor.

In one embodiment, the PDP also conveys a 'Pairwise Master Key' (PMK) to the NAD as part of the access decision in query block 630. The client device is responsible for generating the PMK as a natural part of completing the authentication protocol. In one embodiment, the generated PMK serves as an introduction between the client device and the NAD to perform a subsequent handshake protocol, such as an Authenticated Device Session Key protocol, also known as a '4-way-handshake', within the wireless IEEE 802.11i framework. The generated PMK may also generate a session key for protecting the data traffic between the client device and the NAD.

Once a decision is made in query block 630 to grant network access, policy information to govern the network access is determined in block 640. The policy information for the platform requesting access is conveyed to a NAD and/or a Policy Enforcement Point (PEP). The NAD and/or PEP, in one embodiment, control if and under what restrictions the client device is allowed to get onto the network.

Regardless of whether network access is granted or denied in query block 630, the results are transmitted from the remote device to the access requestor in block 650. If network access was granted in block 630, updated policy information from block 640 to be enforced on the requesting device may also be transmitted in block 650.

Referring to FIG. 7, a flow diagram view of a portion of the operations of a host platform 700 as presented in FIGS. 1 and 4 is shown in further detail, in accordance with various embodiments. In block 710, host platform 700 determines and maintains platform posture information. The platform posture information may also be used to store state information of previous connections of the host platform 700.

In one embodiment, platform posture information being stored and monitored may include platform identification, platform revision identification, Basic Input/Output System (BIOS) identification, BIOS revision identification, Extensible Firmware Interface (EFI) identification, EFI revision identification, host operating system identification, host operating system revision identification, and Trusted Platform Module capability identification.

In one embodiment, the platform posture information also includes a tamper-resistant authentication token associated with prior network access grant(s) to alleviate overhead associated with a protracted authentication and to provide a faster reconnection time. Accordingly, a remote device, such as the PDP, may have previously generated the token as a part of the last message sent to the client or host platform 700. This token can contain a number of items, including security parameters and configuration information, needed to quickly reestablish trust between the host platform 700 and the network access device. The contents of this token can be mostly opaque to the client, where only non-security related information is visible.

In one embodiment, a secure embedded partition or co-processor on the host platform 700 client is responsible for maintenance, monitoring, and storage of prior platform posture information in block 710. As such, the host platform 700, in query block 720, may subsequently determine whether the host platform 700 remains qualified to attempt an accelerated authentication and authorization exchange in conjunction with the next access request and/or reconnection attempt (e.g., when roaming to a different NAD/AP in a wired/wireless domain).

If the host platform 700 is not qualified, the host platform 700 and/or the PDP are free to initiate a full authentication and authorization exchange in block 725. If the host platform 700 is qualified, the host platform 700 may transmit the stored prior platform posture information in block 720 to attempt an accelerated network access authentication exchange.

Regardless of which access request method is used, the host platform 700 may receive updated policy information with respect to network access in block 740. In one embodiment, the policy information received in block 740 includes one or more data elements to allow and/or to restrict one or more services from executing on the host platform 700.

In various embodiments, the received policy information is enforced in block 740 by a trusted PEP associated with the host platform 700. In one embodiment, the PEP may include the processor and management components within a trust anchor on the host platform 700.

Although specific embodiments have been illustrated and described herein, it will be appreciated by those of ordinary skill in the art and others, that a wide variety of alternate and/or equivalent implementations may be substituted for the specific embodiments shown and described without departing from the scope of the present invention. This application is intended to cover any adaptations or variations of the embodiment discussed herein. Therefore, it is manifested and intended that the invention be limited only by the claims and the equivalents thereof.

What is claimed is:
1. An apparatus comprising:
an input/output interface configured to be coupled to a networking interface of a mobile device on which the apparatus is designed to be installed, wherein the mobile device, in addition to the networking interface, further includes a processor coupled with the networking interface, and the processor is configured to execute an operating system of the mobile device;
non-volatile storage configured to store a network access token associated with an authenticated network connection of the mobile device to access a network, wherein the network access token is provided to the mobile device while the mobile device is at a first location by a first network access device configured to facilitate the mobile device to access the network while the mobile device is around the first location;
one or more platform management components configured to, upon roaming of the mobile device from the first location to a second location, transmit, through the input/output interface, the stored network access token to a second network access device to reestablish access to the network, wherein the second network access device is configured to facilitate the mobile device to access the network while the mobile device is around the second location; and a processing core, separate and distinct from the processor, coupled to the input/output interface and the non-volatile storage, and configured to operate the one or more platform management components independent of the processor, wherein the one or more platform management components include at least one firmware agent configured to:
prevent any code executing within the operating system of the mobile device from circumventing the at least one firmware agent or modify firmware agent code; and have exclusive access to the input/output interface, wherein the input/output interface is further configured to expire after a predetermined time period and be refreshed, with the second network access device, during re-authentication at the reestablishment of access to the network.

2. The apparatus of claim 1, wherein the network access token includes at least one token parameter selected from a group consisting of a token identifier, a token version identifier, a token validity timestamp, a token context identifier, and an integrity check value (ICV).

3. The apparatus of claim 1, wherein network access while the mobile device is around the second location is associated with a connection type that is different from a connection type associated with network access while the mobile device is around the first location.

4. The apparatus of claim 3, wherein network access while the mobile device is around the first location is associated with a wired connection type and network access while the mobile device is around the second location is associated with a wireless connection type, or vice-versa.

5. The apparatus of claim 1, wherein the network access token is configured to indicate host posture information and/or firmware posture information of the mobile device.

6. The apparatus of claim 5, wherein the one or more platform management components are further configured to generate another network access token to indicate intervening changes to host posture information and/or firmware posture information of the mobile device prior to the mobile device arrived at the second location.

7. The apparatus of claim 5, wherein the host posture information of the mobile device includes at least one identification parameter selected from a group consisting of a platform identification of the mobile device, a platform revision identification of the mobile device, a Basic Input/Output System (BIOS) revision identification of the mobile device, an Extensible Firmware Interface (EFI) revision identification of the mobile device, a host operating system revision identification of the mobile device, software application version identification of the mobile device, software application integrity identification of the mobile device, and a Trusted Platform Module capability identification of the mobile device.

8. The apparatus of claim 5, wherein the firmware posture information of the mobile device includes one or more parameters selected from a group consisting of an operational mode of the mobile device, a transport layer security (TLS) state of the mobile device, a Crypto enabled fuse state of the mobile device, a provisioning state of the mobile device, a network interface state of the mobile device, an IDER state of the mobile device, a Serial over LAN (SoL) state of the mobile device, a firmware (FW) update state of the mobile device, a posture version state of the mobile device, a module version state of the mobile device, and a link state of the mobile device.

9. The apparatus of claim 1, wherein the one or more platform management components are configured to receive policy information as part of an authenticated and encrypted payload sent in response to the transmitted network access token.

10. The apparatus of claim 9, wherein the policy information includes a pair-wise master key (PMK).

11. The apparatus of claim 10, wherein the PMK of the policy information is derived from one or more existing key constraints related to one or more parameters selected from a group consisting of a freshness time indicator, a nonce value, a firmware version of the mobile device, and a firmware operational status of the mobile device.

12. The apparatus of claim 9, wherein the one or more platform management components are configured to facilitate and control network access of the mobile device based at least in part on the transmitted network access token and on the received policy information.

13. A system comprising:
a host platform;
a network interface resident on the host platform;
a mass storage device resident on the host platform;
a first processor resident on the host platform and coupled to the network interface and the mass storage device;
a second processor resident on the host platform and coupled with the network interface;
memory resident on the host platform and configured to store a network access token associated with an authenticated network connection of the host platform to access a network, wherein the network access token is provided to the host platform while the system is at a first location by a first network access device configured to facilitate the host platform to access the network while the system is around the first location;
an operating system and one or more software components configured to be executed by the first processor, wherein the one or more software components are configured to be executed under control of the operating system, and wherein the control includes controlling network access through the network interface by the one or more software components; and
one or more platform management components configured to be executed by the second processor, independent of the first processor, upon the system roams from the first location to a second location, to transmit, via the network interface, to a second network access device the stored network access token to reestablish a connection to the network for the host platform at the second location, wherein the second network access device is configured to facilitate the host platform to access the network while the system is around the second location,
wherein the one or more platform management components include at least one firmware agent configured to:
prevent any code executing within the operating system of the mobile device from circumventing the at least one firmware agent or modify firmware agent code; and have exclusive access to an input/output interface coupled to the network interface,
wherein the input/output interface is further configured to expire after a predetermined time period and be refreshed, with the second network access device, during re-authentication at the reestablishment of access to the network.

14. The system of claim 13, wherein the connection to the network at the second location has a connection type that is different than a connection type of the connection to the network at the first location.

15. An article of manufacture comprising:
   a non-transitory tangible computer-readable storage medium having stored therein a plurality of programming instructions, wherein the programming instructions, when executed by a first processor installed on a host electronic device, are configured to operate one or more platform management components to perform operations comprising:
   receiving and storing in a non-volatile memory of the host electronic device a network access token associated with an authenticated network connection of the host electronic device to access a network, wherein the network access token is provided to the host electronic device while the host electronic device is at a first location by a first network access device configured to facilitate the host electronic device to access the network while the host electronic device is around the first location;
   upon the host electronic device roaming from the first location to a second location, transmitting, via a network interface of the host electronic device, the network access token to a second network access device to reestablish access to the network, wherein the second network access device is configured to facilitate the host electronic device to access the network while the host electronic device is around the second location;
   receiving policy information from the second network access device via the network interface, the policy information governing network access policies of the host electronic device while the host electronic device is around the second location; and
   enforcing network access policies of the host electronic device while the host electronic device is around the second location, based at least in part on the received policy information;
   wherein the first processor is configured to operate the one or more platform management components independent of a second processor operating an operating system of the host electronic device;
   wherein the one or more platform management components include at least one firmware agent configured to:
      prevent any code executing within the operating system of the host mobile device from circumventing the at least one firmware agent or modify firmware agent code; and
      have exclusive access to an input/output interface coupled to the network interface,
   wherein the input/output interface is further configured to expire after a predetermined time period and be refreshed, with the second network access device, during re- authentication at the reestablishment of access to the network.

16. The article of manufacture of claim 15, wherein the second network access device comprises a network access policy decision point (PDP).

17. The article of manufacture of claim 15, wherein the network access token includes at least one parameter selected from a group of a connection medium of a prior network access grant, a connection location of the prior network access grant, a nonce associated with the prior network access grant, an existing pair-wise master key (PMK) associated with the prior network access grant, and a tamper-resistant authentication token associated with the prior network access grant.

* * * * *